United States Patent
Anderle et al.

(10) Patent No.: US 8,698,890 B2
(45) Date of Patent: Apr. 15, 2014

(54) METHOD FOR CONTROLLING A TDI-CCD IMAGE SENSOR

(75) Inventors: Klaus Anderle, Darmstadt (DE); Thomas Graen, Darmstadt (DE)

(73) Assignee: GVBB Holdings S.A.R.L., Luxembourg (DE)

( * ) Notice: Subject to any disclaimer, the term of this patent is extended or adjusted under 35 U.S.C. 154(b) by 932 days.

(21) Appl. No.: 12/308,497

(22) PCT Filed: Jun. 6, 2007

(86) PCT No.: PCT/EP2007/055600
§ 371 (c)(1), (2), (4) Date: Dec. 16, 2008

(87) PCT Pub. No.: WO2007/144304
PCT Pub. Date: Dec. 21, 2007

(65) Prior Publication Data
US 2010/0238522 A1    Sep. 23, 2010

(30) Foreign Application Priority Data

Jun. 16, 2006   (EP) ..................................... 06300593

(51) Int. Cl.
*H04N 3/38* (2006.01)
(52) U.S. Cl.
USPC ........................................................... 348/96
(58) Field of Classification Search
USPC ..................... 348/96, 111, 112; 358/474, 483
See application file for complete search history.

(56) References Cited

U.S. PATENT DOCUMENTS

| | | | |
|---|---|---|---|
| 4,855,836 | A | 8/1989 | Shearer |
| 4,896,211 | A | 1/1990 | Hunt et al. |

(Continued)

FOREIGN PATENT DOCUMENTS

| | | | | |
|---|---|---|---|---|
| EP | 0366235 | | 5/1990 | |
| EP | 366235 | A1 * | 5/1990 | ............. G01N 21/89 |

(Continued)

OTHER PUBLICATIONS

Search Report Dated Nov. 2, 2007.

(Continued)

*Primary Examiner* — Mehrdad Dastouri
*Assistant Examiner* — Mohammed Rahaman
(74) *Attorney, Agent, or Firm* — Arent Fox LLP

(57) ABSTRACT

A method for controlling a scanning apparatus for scanning a continuously moved object includes seizing the actual momentary position of the moving object, and controlling the time instant or period in which image information is captured by the scanning devices in dependence of the actual momentary position of the object. The scanning apparatus in which the method is used includes a multiplicity of line scanning devices arranged adjacent to each other in the direction of the movement of the moved object. Each of the line scanning devices has a multiplicity of pixels that are arranged adjacent to each other in a direction across a path along which the object is moved. The pixels of the line scanning devices accumulate charges according to the amount of incident light. A controlling means is provided for transferring the charges accumulated in individual pixels to pixels in the adjacent line scanning device in synchronism with direction of the movement and the speed of the moving object. The object is illuminated or transilluminated by a light source.

13 Claims, 2 Drawing Sheets

(56) References Cited

U.S. PATENT DOCUMENTS

Figure 3:
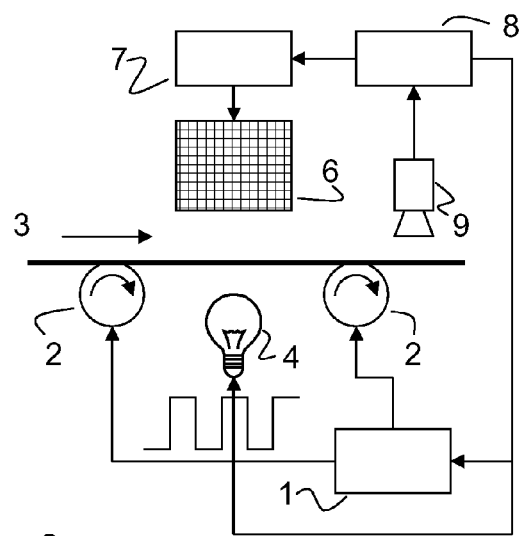

| | | | | |
|---|---|---|---|---|
| 5,365,084 | A | * | 11/1994 | Cochran et al. .......... 250/559.02 |
| 5,562,788 | A | * | 10/1996 | Kitson et al. ..................... 156/64 |
| 6,040,057 | A | | 3/2000 | Slimak et al. |
| 2002/0166983 | A1 | * | 11/2002 | Katzir et al. ............. 250/559.45 |
| 2003/0198364 | A1 | * | 10/2003 | Yonover et al. ............... 382/103 |
| 2004/0008347 | A1 | * | 1/2004 | Kwok et al. .................. 356/331 |
| 2004/0135914 | A1 | * | 7/2004 | Wen ............................. 348/311 |

FOREIGN PATENT DOCUMENTS

| | | | |
|---|---|---|---|
| EP | 0543629 | | 5/1993 |
| EP | 0738886 | | 10/1996 |
| EP | 0738886 A2 * | 10/1996 | ............. G01N 21/00 |
| JP | 5-76005 | | 3/1993 |

OTHER PUBLICATIONS

International Preliminary Report on Patentability for International Application No. PCT/EP2007/055600 dated Dec. 16, 2008 from The International Bureau of WIPO.

Written Opinion of the International Searching Authority for PCT/EP2007/055600 dated Dec. 16, 2008 from the European Patent Office.

* cited by examiner

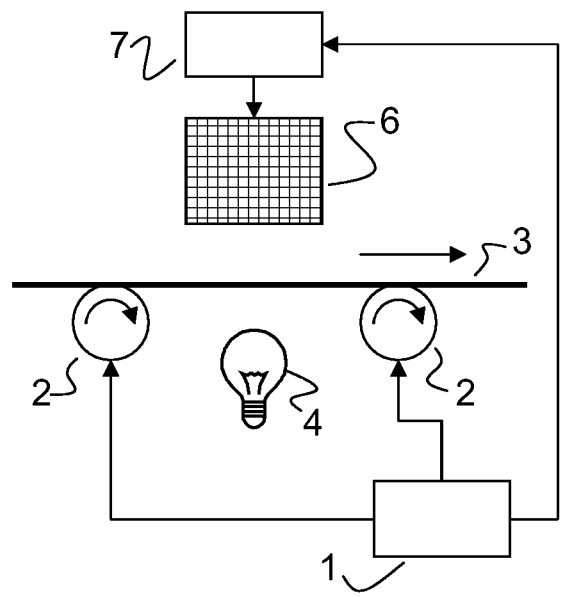
Fig. 1     Prior Art
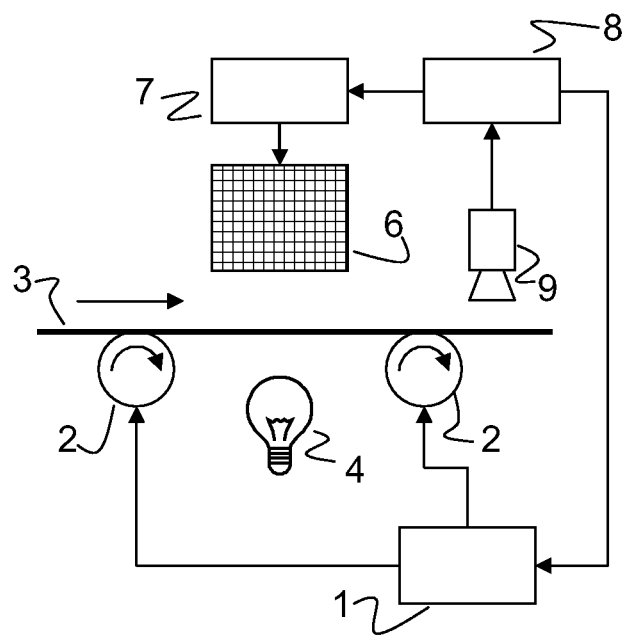
Fig. 2

METHOD FOR CONTROLLING A TDI-CCD IMAGE SENSOR

This application claims the benefit, under 35 U.S.C. §365 of International Application PCT/EP2007/055600, filed Jun. 6, 2007, which was published in accordance with PCT Article 21(2) on Dec. 21, 2007 in English and which claims the benefit of European patent application No. 06300593.8, filed Jun. 16, 2006.

The invention relates to a method for controlling a TDI-CCD image sensor in synchronism with the movement of an image-carrying medium which is passed along the image sensor for capturing an image.

In a film scanner with continuous transportation of the film to be scanned line sensors are used for scanning the images. A scanned image is produced by scanning the film that is passed along the sensor in a line-by-line manner. Depending on the desired resolution of the scanned image a predetermined number of adjacent scan lines form the representation of the scanned image. The maximum time that is available for scanning one line is determined by the number of frames that are to be passed along the sensor in a predetermined time and the number of lines that are to be scanned in each frame, i.e. the desired resolution of the scan. The integration time that is necessary for obtaining a desired light level to be received by the image sensor may be reduced by increasing the amount of light that is used for illuminating or transilluminating the film. In an ideal film scanner the amount of light that is available for transilluminating the film is so high that it is possible to reduce the integration time next to zero. In this case, the sharpness of the scanned image would be increased to the maximum possible extent, as the integration time only represents a small fraction of the time the film needs to travel the scanning height of one line. As it is not always possible to increase the amount of light used for illuminating or transilluminating the film to the extent needed, TDI-CCD sensor arrangements can be used to improve the light usage efficiency. In a TDI-CCD sensor arrangement multiple CCD lines are placed in parallel. The individual CCD lines are arranged across the film. The charge in each CCD cell is moved from one line to the next line in synchronism with the film transportation speed and in the direction of the film transportation. This results in each area on the film that is corresponding to a pixel in the scanned image contributing several times to the total charge that this representing the value of the pixel in the scanned image. In other words, the area on the film corresponding to a pixel in the scanned image is effectively exposed for a longer time. However, a certain smear may appear due to non-synchronised movement or jitter of the film relative to the photosensitive areas related to this film position in the TDI-CCD sensor, thus reducing the effective resolution of the scanned image.

FIG. 1 shows a schematic view of an exemplary film scanner known from the prior art, in which a TDI-CCD image sensor is used. A control circuit 1 controls drive motors 2 which transport the film 3 in the direction of the arrow. A light source 4 transilluminates the film 3 onto a TDI-CCD image sensor 6. Control circuit 1 provides a signal corresponding to the set speed to a control circuit 7, which controls the movement of charges accumulated in one line of a TDI-CCD image sensor 6 to the adjacent line, in accordance with the speed and in the direction of the film transport. However, the set speed must not necessarily correspond with the actual speed, for example due to varying friction in the drive motors and manufacturing tolerances in the take-up and supply reels of the film.

It is, therefore, desirable to achieve an increased resolution in film scanners operating according to the TDI-CCD principle.

A method according to the invention is adapted for controlling a scanning apparatus for scanning a continuously moved object. The scanning apparatus includes a multiplicity of line scanning devices arranged adjacent to each other in the direction of the movement of the moved object. Each of the line scanning devices has a multiplicity of pixels that are arranged adjacent to each other in a direction across a path along which the object is moved. The pixels of the line scanning devices accumulate charges according to the amount of incident light. A controlling means is provided for transferring the charges accumulated in individual pixels to pixels in the adjacent line scanning device in synchronism with direction of the movement and the speed of the moving object. The object is illuminated or transilluminated by a light source. According to the inventive method, the actual momentary position of the moving object is seized, and the time instant or period in which image information is captured by the scanning devices is controlled in dependence of the actual momentary position of the object.

In one embodiment of the invention, controlling the time instant or period in which image information is captured by the scanning devices includes transferring the charge of individual pixels representing image information to the adjacent line scanning device in dependence of the actual momentary position of the object.

According to another aspect of the invention, a light source is provided which produces light pulses the beginning and duration of which is controlled in dependence of the momentary position of the object.

In one embodiment of the invention, only the beginning and duration of the light pulses is controlled in dependence of the momentary position of the object, whereas in another embodiment also the transfer of charges from one CCD line to the next, adjacent CCD line is controlled in dependence of the momentary position of the object.

In a development, beginning and duration of the light pulses is controlled in dependence of the intensity of the light pulses issued by the light source.

In another development, the beginning and duration of the light pulses is controlled in dependence of the amount of light that is required for full exposure of a pixel in the line scanning device. In this way, the dynamic range of the sensor can be fully exploited. In case a section of the film is fully transparent or a part of the object is fully reflective it is also possible to calibrate the light pulses to match the properties of the sensor to the properties of the film or object.

In order to increase the resolution of the scanned image the time that is available for the integration of light incident on an image cell of the sensor is reduced in accordance with the maximum amount of light that is available. For reducing jitter between the lines it is suggested to control the time during which charges are integrated according to the actual film position.

If the film is continuously lit, the film position is detected and the best suited time for moving the charges from one CCD line to the next is determined, thus defining the light integration period, according to the film position. If the film is lit by a pulsed light source the beginning of the integration time is also determined based on the actual film position.

In both cases it is ensured that there is a fixed correlation between the charge in the TDI-CCD cells and the respective assigned area on the film.

The film position may be determined by optical or mechanical sensor systems. In a preferred embodiment of the invention the actual position of the film is taken from the means that are provided for correcting steadiness errors. The means that are provided for correcting steadiness errors use marks on the film which have a fixed spatial relationship to the image on the film.

Temporary changes in the speed of the continuous film transport have to be compensated for by accordingly changing the time in which the charges from one CCD line are transferred to the next CCD line.

When the film is lit by a pulsed light source the pulse duration has to be chosen as short as possible in order to minimise the overlap between adjacent scan areas.

Instead of varying the time instant when the charges are transferred it is also possible to vary the instant when the film is lit by the pulsed light source.

In the ideal case of very short light pulses that are in perfect synchronism with the film transport no overlap between the lines exists, and each individual CCD cell in a succession of CCD cells in the transport direction integrates the light of exactly the same spot on the film, thus contributing to the total amount of light integrated for that specific spot.

FIG. 2 shows a schematic block diagram of an exemplary film scanner according to the invention. As known from the prior art, a first control circuit 1 controls the speed of drive motors 2, which transport the film 3 to be scanned in the direction of the arrow. A light source 4 transilluminates the film 3 onto a TDI-CCD image sensor arrangement 6. Contrary to the prior art means 9 for detecting the film speed and/or position are provided. The information about the film speed and/or the film position is supplied to a second control circuit 8. The second control circuit 8 supplies the information about the film speed to the first control circuit 1 as a feedback for controlling the speed. The information about the film speed and/or the film position is further supplied to a third control circuit 7, which controls exposure and transport from one line to an adjacent line of charges integrated in the TDI-CCD image sensor arrangements 6.

The means 9 for detecting the film speed and/or position is, for example, a sensor arrangement that scans the sprocket holes on the film. The means 9 for detecting the film speed and/or position may also include rollers mechanically engaging with the film and providing information about speed and/or position. Generally spoken, the means for seizing the actual position of the moving object includes optical or mechanical scanners for scanning features of the object that have a position that is fixed at least with respect to parts of the object.

FIG. 3 shows an embodiment of the inventive film scanner, which essentially corresponds to the embodiment described under FIG. 2. However, in this embodiment the light source 4 is a pulsed light source. Begin and duration of the light pulses emitted by the light source 4 are controlled by the second control circuit 8, in accordance with information about the speed and/or position of the film 3.

Figure 4:
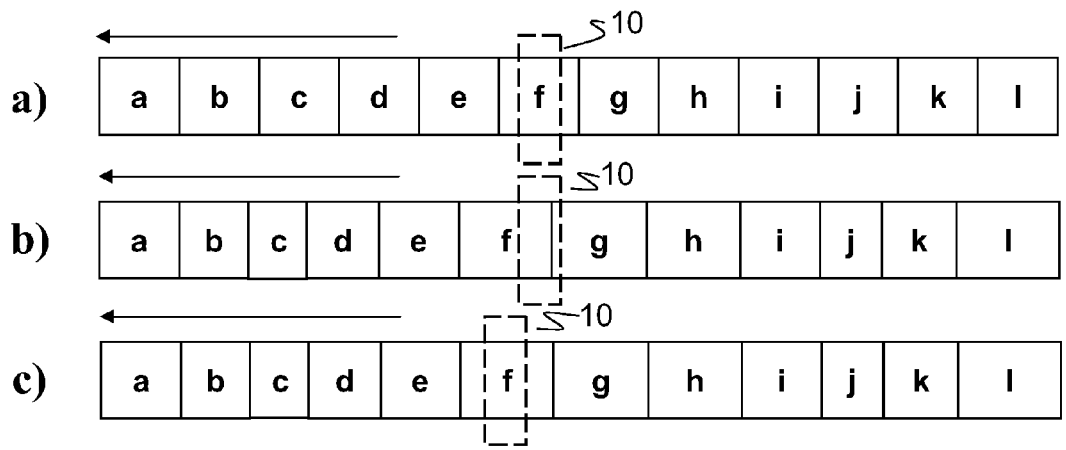

The effect of a non-constant film transport speed will be elucidated with reference to FIG. 4. In the figure only a single line of a CCD image sensor that is arranged across the film is represented for reasons of simplicity. It will be apparent that the effect that is described below also applies to a CCD image sensor consisting of multiple parallel lines of individual image sensors as, e.g., in a TDI-CCD image sensor.

In FIG. 4a) a number of square areas 'a' to 'l' representing pixels on a film that are located adjacent to each other in the direction of the film transport is shown. In the ideal case of a perfectly constant film transport speed each pixel would have the same length for a line of CCD image sensors that is arranged across the film. The single line of CCD image sensors is represented by the dashed box 10 crossing the square area indexed 'f'. The direction of the film transport is indicated by the arrow pointing from left to right.

In FIG. 4b) the speed of the film transport is not constant, i.e. changes with time. In this case the virtual length of each individual square area representing a pixel on the film depends on the momentary transport speed when passing the single line of a CCD image sensor. In FIG. 4b) this is indicated by rectangular areas having different lengths. The non-constant transport speed results in different periods of time available for integrating light that is falling onto the image sensor for each individual pixel.

FIGS. 4a) and 4b) are shown vertically aligned one over each other. In both figures the same number of pixels or rectangular areas representing the pixels passes along the single line of the CCD image sensor. The total length of the pixels passing by in FIGS. 4a) and 4b) is equal. Thus, the average film transport speed is the same. If the moment in time when the CCD sensor takes an image is calculated based on the average speed the result would be acceptable in case the transport speed is perfectly constant over time. For example, it is desired to acquire an image in the middle of a pixel, as is shown in FIG. 4a) for the square area indexed 'f'. As the average film transport speed in both, FIG. 4a) and FIG. 4b) is equal, the moment in time when the image sensor takes the image is the same. As can be seen in FIG. 4b) the image is not taken in the middle of the pixel indexed 'f' but rather at the transition between the pixels indexed 'f' and 'g'. As is shown in the figure the image sensor even acquires a part of the pixel indexed 'g'. This can result in a drastic reduction of the sharpness of the scanned image.

If a TDI-CCD image sensor is assumed the reduction of the sharpness of the scanned image is even aggravated, in case the charge transfer is not synchronised with the film transport. In this case the charge that is transferred from one line of the image sensor to the next line of the image sensor in a presumed synchronism with the transport speed can be generated from various pixels on the film instead of always being generated by the same pixel on the film.

In a film scanner according to the invention the actual momentary film transport speed and hence the position of each area on the film representing a pixel is known. As is shown in FIG. 4c) the film scanner according to the invention corrects for the variation in the film speed by accordingly controlling begin and end of the integration time and, in case of a TDI-CCD image sensor, the transport of the integrated charge to the adjacent line of image sensor elements such that an image is always taken at a desired position within an area representing a pixel on the film.

The rectangular sensor area shown in FIG. 4 is used for clarity only. Although it is conceivable to use sensor areas shaped rectangular as shown in the figure, most image sensors feature square sensor areas having the size of the pixel on the film that is scanned. Due to the non-infinitesimal exposure a minimal amount of smear may be present. This smear occurs when an area belonging to the next following pixel enters the area of the sensor. Even when the charge is transferred in synchronism with the film transport, the charge may contain image information from the desired pixel and the following pixel, as exposure of the sensor continues during the charge transport in the case of constant illumination. However, proper synchronisation of the charge transfer in a TDI-CCD image sensor reduces the overlap of neighbouring pixels. An infinitesimal exposure period, e.g. by a very short light pulse having a very high intensity would further reduce the minimal amount of smear.

In one embodiment of the invention charge integration and charge transfer is synchronised with the actual momentary film transport speed. In this way it is possible to always integrate charges in the CCD elements in a desired position within an area representing a pixel on the film. In the case of a TDI-CCD image sensor the charges are only transferred to the adjacent line of CCD image sensors when the area representing a pixel on the film is actually moving into the scanning range of the adjacent line.

In another embodiment of the invention the light source used for illuminating or transilluminating the film is a pulsed light source. In this case, the light pulses emitted for illuminating or transilluminating the film may also be triggered in synchronism with the actual momentary transport speed. In this case it is possible to illuminate the film only then when the area representing a pixel on the film is in a desired position with respect to the image sensing arrangement. As no light is emitted by the light source in between two pulses no charges are integrated in the CCD image sensing elements between two pulses. Consequently, no charges are integrated from areas on the film which are not intended to contribute to the scanned image. In the case of a TDI-CCD image sensor the charges may be transferred to an adjacent line of image sensing elements during the time between two pulses of the light source.

Figure 5:
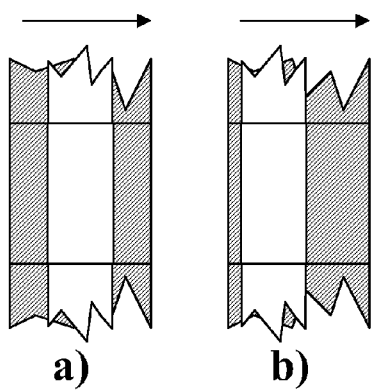

The pixels or sensor elements of the line scanning device may have at least one effective dimension that is smaller than the corresponding dimension of a respective area on the object that is to be scanned by the respective pixel. For example, the width of a sensor element in a direction across the object to be scanned may be given by the length of the sensor line and the desired resolution. The dimension of the sensor element of the line sensor in the direction of the film transport may be smaller than the other dimension or the area on the object to be scanned. In that way a rectangular pixel is used in the sensor arrangement rather than a square pixel. This is shown in a diagrammatic way in FIG. 5. In FIG. 5 the area on the film to be scanned is represented as a square area marked with hashed lines. Only one full area is shown, together with two parts of adjacent areas that are located in a direction perpendicular to a direction of transport of the film. The direction of transport is indicated by the arrow. In FIG. 5 a) the exposure of the sensor element is triggered in the middle of the area to be scanned. The area captured by the sensor element or the active is represented by the white rectangular area. This area may be captured either by a very short, flash-like exposure or by a longer exposure. In the first case, the white area corresponds to the size of the sensor element; in the latter case the sensor element is smaller in the direction of transport of the film. FIG. 5 b) shows a shift in the time of trigger of exposure. Here, the exposure is triggered later, i.e. the centre of the area to be scanned as one pixel has almost passed before the exposure is triggered. In this way a certain degree of freedom of the position at which the exposure of the sensor is triggered is achieved with regard to the area to be scanned, which can be useful e.g. when a pulsed light source is used.

In the description above it is assumed, for simplification purposes, that the image captured on the film is made up from square pixels. Actual cinematographic film, however, does not have a square pixel structure. However, depending on the resolution of the film scanner and the design of the individual photo-sensitive elements of the image sensor, one element of the image sensor acquires an image of an area on the film that is shaped according to the design of the individual elements of the image sensor. Although the foregoing description refers to an exemplary square-shaped element of an image sensor and hence to exemplary square-shaped pixels it is obvious that the principles described above apply to any image sensor that includes individual image sensing elements arranged in a line or in multiple parallel lines.

Although the invention has been described before with reference to a film scanner in which a film is transilluminated it is also conceivable to apply the principles of the invention to a film scanner that is illuminating the film to be scanned from the same side on which the sensor is placed with respect to the film. It is further possible to apply the principles of the invention to any scanning device that uses a TDI-CCD sensor arrangement and in which an object is moved along the sensor arrangement.

It is also possible to apply the principles of the invention described above to image sensors of the CMOS type. For example an array of CMOS imager pixels which extends over the width of the film and which has a number of pixels arranged in the direction of the transport of the film can be used. In this case a full image is taken by the CMOS imager in synchronism with the transport of the film. Whenever the film has been moved for a distance corresponding to the length of a pixel a new full image is captured. Since the position of the film is known and the time instant when each full image is captured is also known each full image can be unambiguously assigned to pixels on the film. In the same way each pixel of the images taken imager can be unambiguously assigned to an area on the film. Instead of transferring the accumulated charges from one line to another, as it is done in a TDI-CCD image sensor, the respective pixels of images taken subsequently that are belonging to the same area on the film are added afterwards. This adding can either take place in the analogue domain, for example in capacitors, or in the digital domain after sampling and analogue-to-digital conversion. Since the respective content of the film does not change over time no reduction in sharpness or blurring due to movement occurs. This development of the invention is particularly well-suited to be used together with a pulsed light source.

The invention claimed is:

1. A method for controlling a scanning apparatus for scanning a continuously moving object comprising:

accumulating charge in a scanning apparatus, wherein the scanning apparatus includes a plurality of line scanning devices arranged adjacent to each other in a direction of a movement of the moving object, wherein each of the line scanning devices has a plurality of pixels that are arranged adjacent to each other in a direction across a path along which the moving object is moving, wherein each pixel of the line scanning devices accumulates a charge representing image information according to an amount of incident light; and transferring, with a controlling means, charge accumulated in each of the plurality of pixels to pixels in the plurality of adjacent line scanning device in synchronism with the direction of the movement and a speed of the moving object, and wherein the object is illuminated by a light source, wherein an actual momentary position of the moving object is seized, and that a time instant or period in which image information is seized by the scanning devices is controlled depending on the actual momentary position of the object; and controlling the light source to produce light pulses comprising an intensity, a beginning and a duration depending on the momentary position of the object; and controlling the beginning and duration of accumulating the charge according to the amount of incident light originating from substantially a same location of the object wherein the beginning and duration of accumulating the charge is controlled depending on the actual momentary position of the scanned object and on the intensity of the light source.

2. The method of claim 1, wherein controlling the time instant or period in which the image information is captured by the scanning devices comprises transferring the charge of individual pixels representing the image information to the adjacent line scanning device depending on the actual momentary position of the object.

3. The method of claim 1, further comprises controlling at least one of the beginning and duration of the light pulses depending on the amount of light that is required for full exposure of a pixel in the line scanning device.

4. A scanning apparatus for scanning a moving object comprising:
a multiplicity of line scanning devices arranged adjacent to each other in a direction of movement of the moving object, wherein each of the line scanning devices has a multiplicity of pixels that are arranged adjacent to each other, wherein each of the line scanning devices are arranged across a path along which the moving object is moved, wherein at least one of pixels of the line scanning devices accumulates charge according to an amount of incident light, wherein a controlling means is provided for transferring the accumulated charge to the adjacent line scanning device in synchronism with a direction and a speed of the moving object, and wherein the object is illuminated by a light source, wherein a means for seizing the actual momentary position of the moving object is provided, that the momentary position is fed to the means for controlling the transfer of the charge to the adjacent line scanning device, and that those pixels of adjacent line scanning devices that are arranged adjacent to each other in the direction of transport accumulate charge according to the amount of incident light originating from substantially a same location of the object, wherein a beginning and duration of accumulating the charge is controlled depending on the actual momentary position of the scanned object and on the intensity of the light source.

5. The scanning apparatus of claim 4, wherein the means for seizing the actual position of the moving object is an optical or mechanical scanner for scanning features of the object that have a position that is fixed at least with respect to parts of the object.

6. The scanning apparatus of claim 4, wherein the light source provides light pulses, wherein a control means is provided for controlling begin and duration of the light pulses depending on the actual momentary position of the object.

7. The scanning apparatus of claim 4, wherein the pixels of the line scanning device have at least one effective dimension that is smaller than the corresponding dimension of a respective area on the object that is to be scanned by the respective pixel.

8. The scanning apparatus of claim 4, wherein the scanning device is a TDI-CCD sensor.

9. The scanning apparatus of claim 4, wherein the object is a film or tape-like medium.

10. The method of claim 1, wherein the illumination is transillumination.

11. The scanning apparatus of claim 6, wherein the illumination is transillumination.

12. A scanning apparatus for scanning a moving object comprising:
a multiplicity of line scanning devices arranged adjacent to each other in a direction of movement of the moving object, wherein each of the line scanning devices has a multiplicity of pixels that are arranged adjacent to each other, wherein each of the line scanning devices are arranged across a path along which the moving object is moved, wherein at least one of pixels of the line scanning devices accumulates charge according to an amount of incident light, wherein a charge transfer controller is provided for transferring the accumulated charge to the adjacent line scanning device in synchronism with a direction and a speed of the moving object, and wherein the object is illuminated by a light source, wherein a timing controller for seizing the actual momentary position of the moving object is provided, that the momentary position is fed to the means for controlling the transfer of the charge to the adjacent line scanning device, and that those pixels of adjacent line scanning devices that are arranged adjacent to each other in the direction of transport accumulate charge according to the amount of incident light originating from substantially a same location of the object, wherein a beginning and duration of accumulating the charge is controlled depending on the actual momentary position of the scanned object, and on the intensity of the light source.

13. A scanning apparatus for scanning a moving object on a web comprising:
a multiplicity of line scanning devices arranged adjacent to each other in a direction of movement of the moving object, wherein each of the line scanning devices has a multiplicity of pixels that are arranged adjacent to each other, wherein each of the line scanning devices are arranged across a path along which the moving object is moved, wherein at least one of pixels of the line scanning devices accumulates charge according to an amount of incident light, wherein a charge transfer controller is provided for transferring the accumulated charge to the adjacent line scanning device in synchronism with a direction and a speed of the moving object, and wherein the object is illuminated by a light source, wherein a timing controller for seizing the actual momentary position of the moving object is provided, that the momentary position is fed to the means for controlling the transfer of the charge to the adjacent line scanning device, and that those pixels of adjacent line scanning devices that are arranged adjacent to each other in the direction of transport accumulate charge according to the amount of incident light originating from substantially a same location of the object by a fixed correlation between the charge and the respective location of the object, wherein the object location is taken from marks on the web having a fixed spatial relation to the object, and wherein a beginning and duration of accumulating the charge is controlled depending on the actual momentary position of the scanned object, and on the intensity of the light source.

* * * * *